(12) United States Patent
Aref

(10) Patent No.: US 6,681,219 B2
(45) Date of Patent: Jan. 20, 2004

(54) METHOD FOR KEYWORD PROXIMITY SEARCHING IN A DOCUMENT DATABASE

(75) Inventor: Walid G. Aref, Indianapolis, IN (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 341 days.

(21) Appl. No.: 09/821,305

(22) Filed: Mar. 29, 2001

(65) Prior Publication Data

US 2002/0143758 A1 Oct. 3, 2002

(51) Int. Cl.[7] ............................................... G06F 17/30
(52) U.S. Cl. ............................................... 707/3; 707/2
(58) Field of Search ..................................... 707/1–10

(56) References Cited

U.S. PATENT DOCUMENTS 5,499,360 A * 3/1996 Barbara et al. ............... 707/5
5,657,450 A * 8/1997 Rao et al. .................... 707/10
6,212,517 B1 * 4/2001 Sato et al. ..................... 707/5
6,377,945 B1 * 4/2002 Risvik .......................... 707/3

* cited by examiner

Primary Examiner—Safet Metjahic
Assistant Examiner—Cindy Nguyen
(74) Attorney, Agent, or Firm—Harness, Dickey & Pierce, PLC

(57) ABSTRACT

Keyword proximity searching in a document database according to a query condition initiates with generation of inverted lists having a location for each instance of the keyword in the document database. A plane-sweep mode is used to efficiently search the inverted lists until an output tuple satisfying proximity criteria in the search query is detected. The method then shifts to a nested-loop search mode to enumerate all possible combinations of the keyword instances that satisfy the proximity search query which are in the neighborhood of the output tuple detected in plane-sweep mode. The method alternates between these two modes of operation until all of the output tuples satisfying the query condition are enumerated.

12 Claims, 2 Drawing Sheets

METHOD FOR KEYWORD PROXIMITY SEARCHING IN A DOCUMENT DATABASE

FIELD OF THE INVENTION

The present invention relates generally to a method for keyword proximity searching in a document database, and more particularly, the present invention optimizes CPU-time and reduces I/O operations associated with keyword proximity searching of a document database.

BACKGROUND OF THE INVENTION

Keyword proximity searching is an important tool for browsing and selecting relevant documents from a large document database. Proximity searching deals with the location and the distance relationship among keywords in a document. For example, the following is a typical keyword proximity search query: given a set of n keywords, find the documents that have a collection of keywords that are within r words from each other. More generally, keyword proximity search may have the form: find the documents in the database that contain all the n search keywords appearing in the same paragraph, page, or within r words, paragraphs, or pages, from each other by implementing a plane sweep search.

Algorithms for answering proximity search queries for a collection of point objects are covered extensively in the literature. Many of the algorithms described in the literature cover the topic from a computational geometry perspective, where the main interest is to develop algorithms that optimize the execution time (i.e., CPU-time) in terms of the input parameters of the problem. On the other hand, when large collections of objects are involved the disk-I/O cost is significant. As a result, from a database perspective, in addition to optimizing CPU-time, the interest is also in reducing the disk-I/O cost for answering such queries.

SUMMARY OF THE INVENTION

The present invention presents a new algorithm for answering keyword proximity search where the words represent objects that are points in the one-dimensional space. The algorithm takes into consideration the fact that the number of words in a document database is typically very large. Hence, it tries to reduce the overhead induced from multiple-retrieval of objects from auxiliary storage. In contrast to other algorithms in the literature, the performance of this new algorithm is optimal. As will be explain below, the overall performance of the algorithm is proportional to the total sizes of the input inverted lists and the size of the reported output tuples.

Assume a given collection of n keywords $c_1 \ldots c_n$, where each keyword has associated with it a list of instances. Each instance in the list contains the location of the keyword in the document database. For example, let the keyword $c_1$ be "dog", $c_2$ be "cat", and $c_2$ be "rat" (i.e., n=3), and the instances correspond to the occurrences of the keywords in various locations of the documents in the database. For example, the instances of the keyword "cat" are <doc1, 15>, <doc1, 123>, <doc2, 25>, and <doc7, 115>which implies that the keyword "cat" appears in document doc1 at locations 15 and 123, in document doc2 at location 25, and in document doc7 at location 115, where doc1, doc2, and doc7 are unique identifies for documents 1, 2, and 7. It should also be noted that page information can be added as part of the location of the word in the document. This helps in extending the proximity search to refer to pages (e.g., find the documents that have the keywords dog and cat within the same page).

The instances of a given keyword are stored in a linear list, where each entry in the list identifies the relative location of the keyword instance as well as an identifier to retrieve the rest of the keyword's description. This is also referred to as an inverted list. Keyword instances are stored in inverted lists so that a given keyword can easily be found in one or more documents. Assume that the entries in a given list (that corresponds to the locations of instances of a given keyword) are sorted according to their location. This is a reasonable assumption if we consider that the lists are constructed by traversing the document and inserting, for each keyword that appears in the documents, the entry (doc-id,pos) at the end of the list for the keyword. As an example, the following is possible entry in the inverted list for the keyword "complex" which appears in documents $doc_1$, $doc_2$, and $doc_4$: ["complex"]—$(doc_1, 6)$, $(doc_1, 20)$, $(doc_1, 50)$, $(doc_2, 30)$, $(doc_4, 100)$, $(doc_4, 130)$. In this case, the list will be sorted in ascending order of the positions of the keyword in the database. For the purposes of the present invention it does not matter whether the elements are sorted in either ascending or descending order.

In contrast to a conventional nested loop searching algorithm, the goal of the present invention is to reduce the number of times the lists are traversed. The keyword proximity search algorithm of the present invention is based on a plane-sweep approach and performs like a merge join algorithm while trying to take advantage of the nature of the proximity condition. This is especially important for large documents and large document databases where the number of instances in each keyword entry is large and the lists of instances cannot be assumed to fit in main memory.

Accordingly, a proximity search algorithm is proposed for answering proximity search queries in a document database. The present invention alternates between two modes of operation to find the matching output tuples. A plane-sweep mode is used to efficiently search the inverted lists, thereby excluding tuples that do not contribute to the output. Once an output tuple satisfying the proximity search query is detected, the plane-sweep mode is terminated. Because of the nature of the proximity search query, some tuples that are in the proximity of the output tuple also satisfy the proximity condition. Hence, the algorithm switches to a nested-loop mode. The nested-loop mode performs a local nested loop join to enumerate all possible combinations of the keyword instances that satisfy the proximity search query in the neighborhood of the output tuple detected by plane-sweep mode. Upon enumerating all of these output tuples, the algorithm switches back to the plane-sweep mode.

For a more complete understanding of the invention, its objects and advantages refer to the following specification and to the accompanying drawings.

DETAILED DESCRIPTION OF THE PREFERRED EMBODIMENTS

Figure 1:
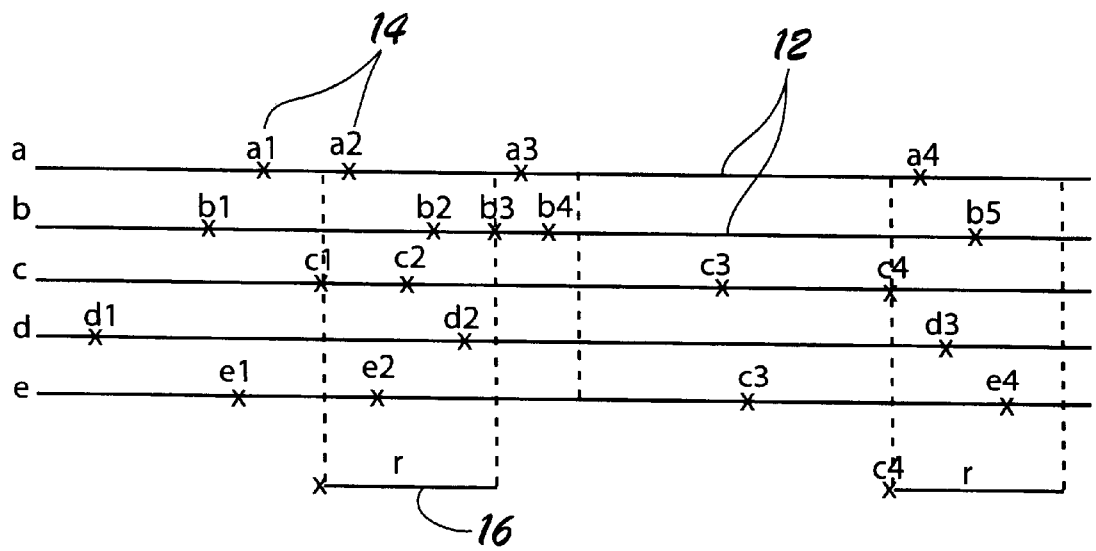
FIG. 1 is a diagram illustrating a keyword proximity search query of a document database in accordance with the present invention.

FIG. 1 illustrates a keyword proximity search query, where the proximity search criterion is composed of five keywords a, b, c, d, and e (i.e., n=5) and a desired proximity distance, r, between each of the keywords. The horizontal lines 12 represent the inverted lists for each keyword while the X's on the lines show the locations 14 of the instances of each keyword. For simplicity, the inverted lists are each labeled a, b, c, d, and e, respectively. Notice that for a given document no two keywords can appear in the same location. In FIG. 1, all the instances $a_2$, $b_2$, $b_3$, $c_1$, $c_2$, $d_2$, and $e_2$ are within the desired proximity distance 16 from each other, and thus satisfy the proximity search criterion. In order to satisfy the proximity search query, all the possible instance-combinations from the above list have to be enumerated. For instance, $<a_2, b_2, c_1, d_2, e_2>$, $<a_2, b_3, c_1, d_2, e_2>$, $<a_2, b_2, c_2, d_2, e_2>$ and $<a_2, b_3, c_2, d_2, e_2>$ are four of the resulting output tuples. Further in the lists, the instance-combination $<a_4, b_5, c_4, d_3, e_4>$ forms another output tuple of the query.

Figure 2:
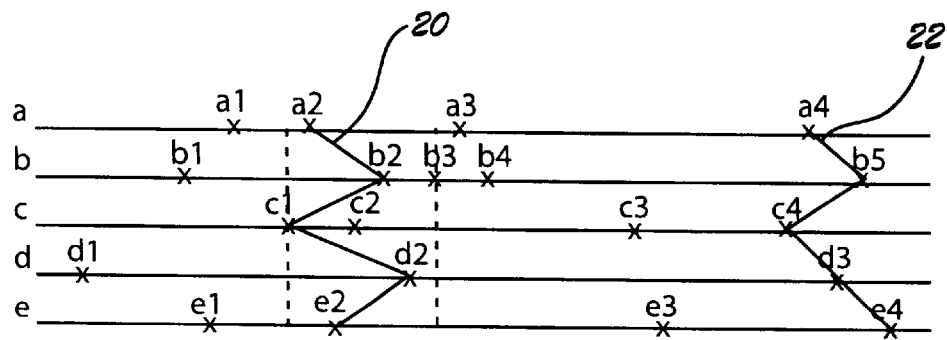
FIG. 2 is a diagram illustrating a plane-sweep search of the constructed inverted lists in accordance with the present invention.

The keyword proximity search algorithm of the present invention processes the lists in two different modes of operation: a plane-sweep mode and a nested-loop mode. Initially, a vertical plane starts at the leftmost of each list (i.e., at location 0, assuming that the locations of instances in the list goes from left to right). The plane sweep mode advances the sweeping vertical plane until an output tuple that satisfies the proximity search condition is located. Referring to FIG. 2, plane-sweep mode will take place until it encounters a first output tuple 20, $<a_2, b_2, c_1, d_2, e_2>$. Once such an output tuple is found, the algorithm switches into a nested-loop mode. The nested-loop mode is intended to check for and generate all the output tuples, if any, that immediately follow the first output tuple 20. This is achieved by advancing the plane-sweep incrementally through the instances that immediately follow the first output tuple. For example, $<a_2, b_3, c_1, d_2, e_2>$, $<a_2, b_2, c_2, d_2, e_2>$ and $<a_2, b_3, c_2, d_2, e_2>$ are three output tuples enumerated by the nested-loop mode. Upon completion, the algorithm switches back to the plane-sweep mode which results in advancing the plane-sweep until a next output tuple 22 is detected, e.g., till the output tuple $<a_4, b_5, c_4, d_3, e_4>$ is detected as shown in FIG. 2. This process continues until all the output tuples are detected and at least one of the lists is entirely traversed by the plane-sweep. At this point, the algorithm terminates. It should be noted that by using the plane-sweep approach, the algorithm processes all the lists in one direction (from left to right) and does not need to backtrack in any of the lists.

A more detailed description follows which illustrates how the plane-sweep mode and the nested-loop mode traverse the inverted lists. First, each of the inverted lists are maintained in an array type data structure. The algorithm also maintains n pointers $p_1 \ldots p_n$, where $p_i$ points to the next instance of the keyword in the list $c_i$. Prior to beginning execution of the plane-sweep mode, $p_1 \ldots p_n$ point to the first instance of each list. During one iteration, the algorithm designates one of the lists as the start-list (termed $c_s$) and uses this list's corresponding pointer $p_s$ to access the next instance in $c_s$. Next, the algorithm proceeds to process list $c_{s+1 \ mod \ n}$, to retrieve its next instance, etc. An iteration is completed once algorithm returns to the start-list or when an exception arises, e.g., when an iteration is restarted by reassigning another list to the start-list $c_s$.

Figure 3:
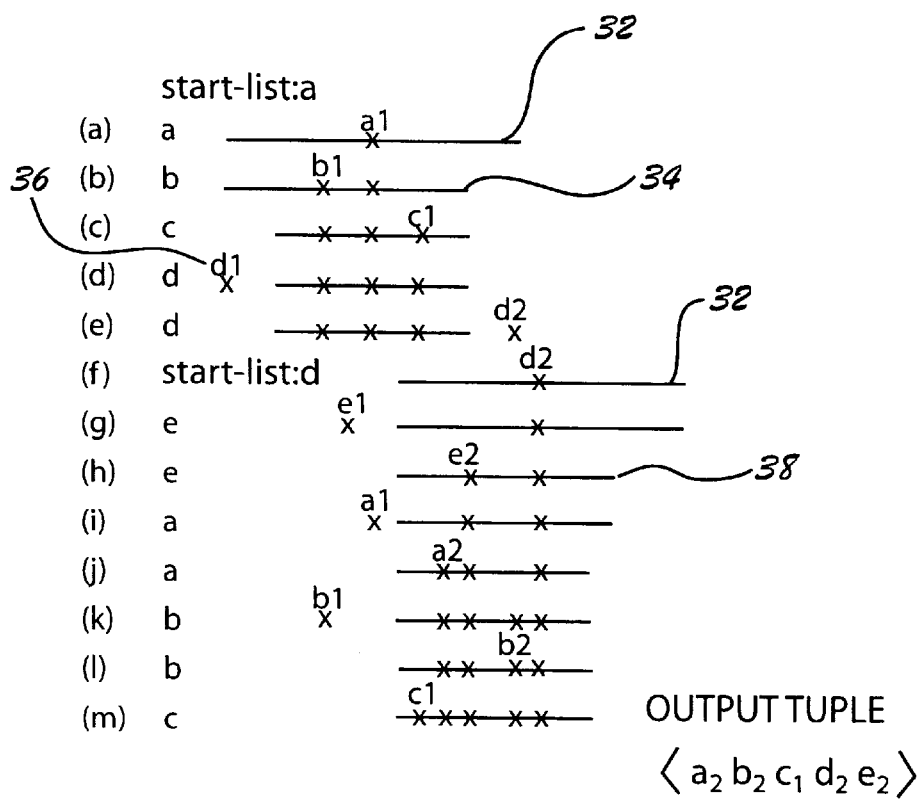
FIG. 3 is a diagram illustrating how a search interval in updated for during a plane-sweep search in accordance with the present invention.

The plane-sweep mode processes the incoming instances from each list as shown in FIG. 3. First, the algorithm assigns list a to be the start-list and retrieves element $a_1$. For $a_1$ to be a part of an output tuple, keyword instances from all of the other lists have to be within the desired proximity distance, r, from $a_1$. In order to detect this, the algorithm constructs a search interval 32, where $a_1$ lies in the middle of the search interval, v. The search interval is further defined as two equidistant segments, where each has a length equal to the desired proximity distance. When the algorithm processes the next list, it retrieves $b_1$ and determines the distance between $a_1$ and $b_1$. In this case, $b_1$ happens to fall within the search interval, and thus $b_1$ is part of a candidate output tuple. In order to guarantee that the upcoming instances that fall within the search interval satisfy the search proximity criterion, the length of search interval is adjusted as shown at 34 based on the location of $b_1$. When $b_1$ lies within the segment on the left side of $a_1$, then the length of the other segment is reduced such that the distance from $b_1$ to the end of that segment is equal to the desired proximity distance. In this way, the search interval will only capture upcoming instances that lie within the desired proximity distance from both $a_1$ and $b_1$.

Similarly, the instance $c_1$ of list c is determined to fall with the adjusted search interval. Therefore, $c_1$ also becomes part of a candidate output tuple and the search interval is updated accordingly. However, $d_1$ is outside and to the left of the search interval at 36 and hence is discarded. The next instance ($d_2$) of the same list is then retrieved. Since $d_2$ is also outside of the search interval, the algorithm is restarted with list d as the start-list.

Again, the algorithm constructs a search interval 32 for the current iteration, where $d_2$ lies in the middle of the search interval. In the new iteration, with d as the start-list, the other lists will be visited in the following order: e, a, b, c. When the algorithm processes the next list, $e_1$ is determined to lie outside and to the left of the new search interval. As a result, $e_1$ is discarded and $e_2$ is retrieved. Because $e_2$ lies within the search interval, it becomes part of a new candidate output tuple. In addition, the search interval is updated based on the location of $e_2$ as shown at 38. Next, instance $a_1$ is re-examined. Unlike the first iteration, $a_1$ is outside and to the left of the new search interval and thus is discarded. However, $a_2$ is retrieved and it does lie within the search interval. Therefore, $a_2$ also becomes part of the candidate output tuple and the search interval is updated accordingly. The algorithm processes lists b and c similarly as shown in FIG. 3. At this point, the whole iteration is complete and the candidate tuple $<a_2, b_2, c_1, d_2, e_2>$ qualifies as an output tuple.

Next, the algorithm of the present invention switches to the nested-loop searching mode. It should be noted that the case where the keyword instances are clustered with high frequencies around each other, as in FIG. 2, is an uncommon occurrence in the typical document database. It is also instructive to mention that the plane-sweep searching mode, as described above, cannot properly handle this case. In other words, all of the possible output tuples will not be enumerated. In order to enumerate all of the possible output tuples, it is necessary to employ the nested-loop searching mode.

The status of the algorithm at the end of plane-sweep mode is passed as input to the nested-loop mode. This status is represented by the pointers $p_1 \ldots p_n$ that correspond to lists $c_1 \ldots c_n$, respectively, where the pointers point to the keyword instances in the lists that form an output tuple. The output n-tuple is $x_1 \ldots x_n$. An n-way nested loop is executed to find and enumerate all the tuples that satisfy the query condition. Each iteration of the nested loop produces an output tuple, except for the last iteration in each of the nested loops. As a result, the cost of the nested loop is asymptotically covered by the number of output tuples produced. In addition, at each iteration of the nested loop, the search interval is updated according to the current set of keyword instances that form the active set of instances of the current iteration. However, the CPU cost of maintaining the interval is very minimal and it does not involve any I/O cost.

Figure 4:
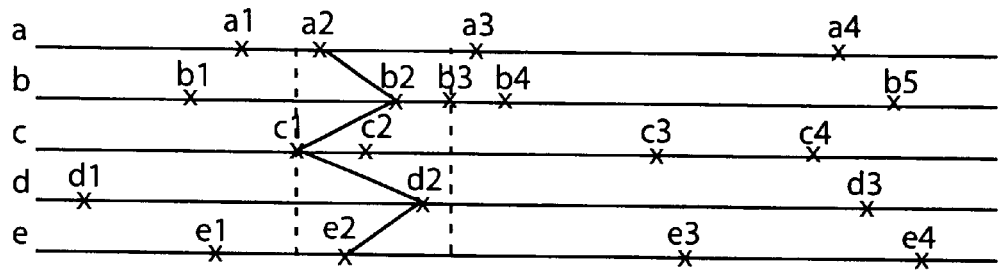
FIG. 4 is a diagram illustrating a nested-loop search of the inverted lists in accordance with the present invention.

A more detailed explanation of the nested-loop searching mode is provided in relation to FIG. 4. The nested-loop mode starts with the current instance $x_1$ in list $c_1$ (e.g., $a_2$ in FIG. 4). Again, the keyword instances of an output tuple must all be within the desired proximity distance, r, from $a_2$. Therefore, a search interval, v, is constructed, where $a_2$ lies in the middle of the search interval. Each of the other lists are then scanned to identify output tuples.

First, the next instance, $b_3$, of the next list is retrieved and then determined to fall within the search interval. In this case, $b_3$ falls within the search interval, and thus $b_3$ is part of a candidate output tuple. As previously described, the search interval is then updated based on the location of $b_3$. Next, the current instance for each of the other lists (i.e., $c_1$, $d_2$ and $e_2$) are then evaluated. For each instance that falls within the search interval, the interval is updated based on the location of that instance. If any instance does not fall within the search interval, then processing moves to the next instance of the next list (i.e., $b_4$). If each of the current instances falls within the search interval, then the candidate output tuple qualifies as an output tuple. In this case, candidate tuple $<a_2, b_3, c_1, d_2, e_2>$ qualifies as an output tuple as shown in FIG. 4.

Since an output tuple was identified, the nested-loop processing continues for the last list until an iteration fails to produce an output tuple. In other words, check if $e_3$ falls within the search interval. Since $e_3$ falls outside of the search interval, processing moves to the previous nested loop (i.e., the loop for list d). Again, the next instance, $d_3$, for this list falls outside the search interval and processing moves to the previous nested loop (i.e., the loop for list c). In this case, the next instance, $c_2$, falls within the search interval, and thus an output tuple is enumerated, $<a_2, b_3, c_2, d_2, e_2>$. Since the next instance, $c_3$, is determined to be outside the search interval, the nested-loop processing is completed for instance $b_3$. At this point, the next instance, $b_4$, is retrieved and the search interval is reconstructed around $a_2$. However, this next instance, $b_4$, falls outside the search interval and processing moves to the next list, c.

Similar nested-loop processing occurs for each of remaining lists (i.e., c, d, and e). If all of the possible n-tuples that contain $a_2$ are enumerated, then the nested-loop mode reports three additional output tuples, namely $<a_2, b_2, c_2, d_2, e_2>$, $<a_2, b_3, c_1, d_2, e_2>$ and $<a_2, b_3, c_2, d_2, e_2>$.

Upon completion of the nested loop mode to enumerate all the output n-tuples that satisfy the proximity query condition, the pointer $p_1$ is advanced to point to the instance in $c_1$, say $x'_1$, that is next to $x_1$. Let $p'_1$ be the new value of $p_1$. The rest of the pointers remain unchanged. The algorithm switches back to plane-sweep mode with $c_1$ as the start-list and the new list pointers $p'_1, p_2, \ldots p_n$. As illustrated in FIG. 4, the algorithm switches back to plane-sweep mode with the pointers pointing to the list elements $a_3, b_2, c_1, d_2$, and $e_2$. The execution of the nested-loop mode and the advancement of the pointer $p_1$, to $x'_1$ guarantees that no output n-tuple is reported twice.

Although the algorithm as stated above works properly, it would also have been possible to continue the execution of the nested-loop mode with the list $x'_1, x_2, \ldots x_n$, until no matches are found (e.g., with elements $a_3, b_2, c_1, d_2$, and $e_2$ as in the case of our example). In this case, $x'_1$ is within the range v that contains the output tuple $x_1, x_2, \ldots x_n$, and thus the nested-loop mode continues execution to enumerate all the output n-tuples that contain $x'_1$.

In other words, two cases may arise when the next keyword instance $x'_1$ is retrieved from the list $c_1$. If $x'_1$ is within v, then the algorithm continues with the nested-loop mode; whereas if $x'_1$ is outside v (i.e., to the right of v), then the algorithm switches back to the plane-sweep mode. Since execution of the nested-loop mode is costly, it is preferable to return to the plane-sweep mode as early as possible. On the other hand, the switch to the plane-sweep mode may be unnecessary if it results in immediately returning to the nested-loop mode.

The time complexity of time-sweep mode of the algorithm is at worst O(N), where $N = \Sigma_{i=1}^{n} s_1$ and $s_1$ is the number of keyword instances in each linked list entry of a keyword that is involved in the proximity search query. This is due to the fact that the algorithm visits each instance in the involved linked list entries at most once, and upon visiting an instance p, the algorithm performs constant work, basically checking whether p lies inside the search interval, and possibly inserting p into the candidate output tuple or resetting the search interval.

The maintenance of the search interval is handled by the algorithm in constant time, i.e., is 0(1) per operation. Checking whether the location of an keyword instance lies inside the interval, inserting an instance into the interval and the modification of the boundaries of the interval upon insertion are all performed by simple constant time comparisons and operations, and hence are 0(1). Therefore, the overhead associated with plane-sweep mode of the algorithm is 0(1) per instance in the linked list entries in the proximity search query and hence sums up to O(N).

The nested-loop mode is the output generation phase of the algorithm. When the number of output tuples of the algorithm is k, then the complexity of nested-loop mode of the algorithm is only O(k). Notice that each iteration of the nested loop produces an output tuple, except for the last iteration in each of the nested loops. As a result, the cost of the nested loop is asymptotically covered by the number of output tuples produced. Moreover, the O(k) complexity implies that the cost per output tuple produced by the algorithm is constant, i.e., is 0(1) per output tuple.

Upon switching to nested-loop mode, the algorithm already contains an output tuple, $o = <^\circ o_1, o_2, \ldots, o_n>$, that needs to be reported. Moreover, in the direct neighborhood of each keyword instance of the output tuple o, there may lie other output tuples. The purpose of the multiply nested loops of nested-loop mode is to report all the possible output tuples that are in the neighborhood of o that follow o in the inverted lists and also contain $o_1$. More formally, assume that for stream $x_i$, i=2, ... n, there are $c_i$ instances that follow instance $o_i$, where all of the $c_i$ instances form output tuples when combined with points from the other streams in the neighborhood of o and contain $o_1$ in them. As a result, the number of output tuples in this case is $k = \Pi_{i=1}^{n} c_i$. On the other hand, each iteration of the nested loop produces an output tuple, except for the last iteration in each of the nested loops. Therefore, the complexity of the multiply nested loops in nested-loop mode is: $O(\Pi_{i=1}^{n} c_1) = 0(k)$. Accordingly, the overall performance of the algorithm is O(N+k), i.e., is linearly proportional to the total sizes of the input inverted lists and the size of the reported output tuples.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

What is claimed is:

1. A method for keyword proximity searching a document database, comprising the steps of:
   (a) providing a query condition, the query condition having a plurality of keywords and a desired proximity distance between each of said plurality of keywords;
   (b) constructing a list for each keyword in the query condition, each list having a location of the keyword for each instance of the keyword in the document database;
   (c) performing a plane-sweep search of the lists to identify a first output tuple which satisfies the query condition by scanning a first list to identify a first output tuple candidate,
   identifying a search range that includes the first candidate and extends the proximity distance in each direction from the first candidate;
   identifying a subsequent candidate by scanning a second list using the search range identified while processing the first candidate; and
   iteratively identifying the first output tuple candidates until all lists are processed; and
   (d) performing a nested-loop search of the lists to identify one or more output tuples within the desired proximity distance of said first output tuple.

2. The method of claim 1 wherein each output tuple includes an instance of each keyword in the query condition such that the distance between each instance is less than the desired proximity distance of the query condition.

3. The method of claim 1 further comprising the step of repeating steps (c) and (d) to identify a plurality of output tuples which satisfy the query condition.

4. The method of claim 1 wherein the step of performing a plane-sweep search further comprises:
   (1) identifying a start-list from the lists of keywords;
   (2) constructing a search interval where a first instance of the start-list lies in the middle of said search interval;
   (3) determining a first distance between a first instance of a second list and said first instance of the start-list, the second list being independent from said start-list;
   (4) adjusting the length of said search interval based on the location of the first instance of the second list, when the first instance of the second list lies within said search interval;
   (5) determining a second distance between a second instance of the second list and the first instance of the start-list, when the first instance of the second list lies outside said search interval; and
   (6) adjusting the length of said search interval based on the location of the second instance of the second list, when the second instance of the second list lies within said search interval.

5. The method of claim 4 wherein the step of adjusting the length of said search interval further comprises:
   defining said search interval as two equidistant segments each having a length equal to the desired proximity distance; and
   reducing the length of a first segment of said search interval such that a distance from said first instance of the second list to an end of the first segment is equal to the desired proximity distance, where said first instance of the second list lies within said second segment of said search interval.

6. The method of claim 4 wherein the step of performing a plane-sweep search further comprises outputting the first output tuple when the query condition includes two keywords and one of said first instance of the second list and said second instance of the second list lies within said search interval.

7. The method of claim 4 wherein the step of performing a plane-sweep search further comprises:
   (7) repeating steps (3)–(6) for a first instance of a third list, when the query condition includes at least three keywords and either of the first instance of the second list or the second instance of the second list lies within said search interval.

8. The method of claim 4 wherein the step of performing a plane-sweep search further comprises:
   (7) establishing the second list as a second start-list, when the query condition includes at least three keywords and the first instance of the second list and the second instance of the second list lie outside said search interval;
   (8) constructing a second search interval where the second instance of the second list lies in the middle of said second search interval; and
   (9) repeating steps (3)–(6) for a first instance of a third list and a first instance of said second start-list, the third list being independent from said start-list and said second list.

9. The method of claim 1 wherein step of performing a nested-loop search further comprises performing plane-sweep searching of the lists when the distance between the second baseline instance and said boundary instance is greater than the desired proximity distance of the query condition.

10. A method of keyword proximity searching a document database system which optimizes the processing time associated with searching the document database, comprising the steps of:
    (a) providing a query condition, the query condition having a plurality of keywords and a desired proximity distance between each of said plurality of keywords;
    (b) constructing a list for each keyword in the query condition, each list having a location for each instance of the keyword in the document database; and
    (c) performing a plane sweep search of searching the lists to identify one or more output tuples which satisfies the query condition, such that the processing time associated with searching the document database is linearly proportional to the size of the lists and the number of reported output tuples.

11. The method of claim 1 wherein the step of performing a plane-sweep search further comprises:
    (a) establishing a start-list from the lists of keywords in the query condition;
    (b) constructing a search interval having a length which is double the desired proximity distance and where a first instance of the start-list lies in the middle of said search interval;
    (c) determining whether a next instance of each list lies within said search interval; and
    (d) re-establishing the start-list when the next instance lies outside of said search interval.

12. A method of keyword proximity searching for reducing input/output operations associated with the storage medium in a document database system, comprising the steps of:

(a) providing a query condition, the query condition having a plurality of keywords and a desired proximity distance between each of said plurality of keywords;

(b) constructing a list for each keyword in the query condition, each list having a location for each instance of the keyword in the document database;

(c) performing a plane-sweep search of the lists to identify a first output tuple which satisfies the query condition by scanning a first list to identify a first output tuple candidate, identifying a search range that includes the first candidate and extends the proximity distance in each direction from the first candidate;

identifying a subsequent candidate by scanning a second list using the search range identified while processing the first candidate; and iteratively identifying the first output tuple candidates until all lists are processed; and (d) performing a nested-loop search of the lists to identify one or more output tuples within the desired proximity distance of said first output tuple, thereby reducing input/output operations associated with the storage medium.

* * * * *

UNITED STATES PATENT AND TRADEMARK OFFICE
CERTIFICATE OF CORRECTION

PATENT NO. : 6,681,219 B2
DATED : February 10, 2004
INVENTOR(S) : Walid Aref

It is certified that error appears in the above-identified patent and that said Letters Patent is hereby corrected as shown below:

Column 8,
Line 33, after "wherein" insert -- the --.
Line 49, after "of" delete "searching".

Signed and Sealed this

Thirteenth Day of April, 2004

JON W. DUDAS
*Acting Director of the United States Patent and Trademark Office*